United States Patent
Hanssen et al.

(10) Patent No.: US 8,320,072 B2
(45) Date of Patent: Nov. 27, 2012

(54) SEALING AN ENCLOSURE FOR A DISK DRIVE FORM FACTOR

(75) Inventors: Steve Hanssen, San Jose, CA (US);
Robert C. Reinhart, San Jose, CA (US);
Kunihiro Shida, San Jose, CA (US);
James Sullivan, San Jose, CA (US);
Stanley Y. Wong, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 620 days.

(21) Appl. No.: 11/542,284

(22) Filed: Oct. 2, 2006

(65) Prior Publication Data

US 2008/0080089 A1    Apr. 3, 2008

(51) Int. Cl.
G11B 33/02    (2006.01)
G11B 33/14    (2006.01)
H05K 5/02    (2006.01)
H05K 5/06    (2006.01)

(52) U.S. Cl. ............... 360/99.21; 360/97.12; 360/99.16

(58) Field of Classification Search .............. 360/97, 360/97.01–97.04, 97.11–97.19, 99.16, 99.21, 360/99.25; G11B 5/012
See application file for complete search history.

(56) References Cited

U.S. PATENT DOCUMENTS

| | | | |
|---|---|---|---|
| 4,818,907 A * | 4/1989 | Shirotori | 310/67 R |
| 5,315,464 A | 5/1994 | Tsujino | |
| 5,508,860 A | 4/1996 | Takagi et al. | |
| 5,596,461 A | 1/1997 | Stefansky | |
| 5,650,895 A | 7/1997 | Koizumi et al. | |
| 5,751,514 A | 5/1998 | Hyde et al. | |
| 5,881,454 A | 3/1999 | Baxter et al. | |
| 6,236,533 B1 | 5/2001 | Forbord et al. | |
| 6,327,814 B1 | 12/2001 | Tsujino et al. | |
| 6,934,126 B1 * | 8/2005 | Berding et al. | 360/264.2 |
| 2002/0057522 A1 * | 5/2002 | Bernett et al. | 360/97.01 |
| 2002/0141107 A1 * | 10/2002 | Kasetty et al. | 360/97.01 |
| 2004/0222712 A1 * | 11/2004 | Hong et al. | 310/67 R |

FOREIGN PATENT DOCUMENTS

JP    4111289    4/1992

* cited by examiner

*Primary Examiner* — Craig A. Renner
*Assistant Examiner* — Gustavo Polo (57) ABSTRACT

Embodiments of the present invention pertain to sealing an enclosure for a disk drive form factor. According to one embodiment, material is removed from a base casting for the disk drive form factor to enable insertion of a component. The removal of the material results in a portion of the base casting being thin enough to potentially cause an inadvertent hole in the base casting. A hole is purpose created in the base casting to avoid development of the inadvertent hole. A seal is used to cover the created hole in a manner that allows for insertion of the component.

7 Claims, 12 Drawing Sheets

SEALING AN ENCLOSURE FOR A DISK DRIVE FORM FACTOR

TECHNICAL FIELD

Embodiments of the present invention relate to manufacturing disk drives. More specifically, embodiments of the present invention relate to sealing an enclosure for a disk drive form factor while at the same time enabling the insertion of a connector into the disk drive form factor.

BACKGROUND

Figure 1A:
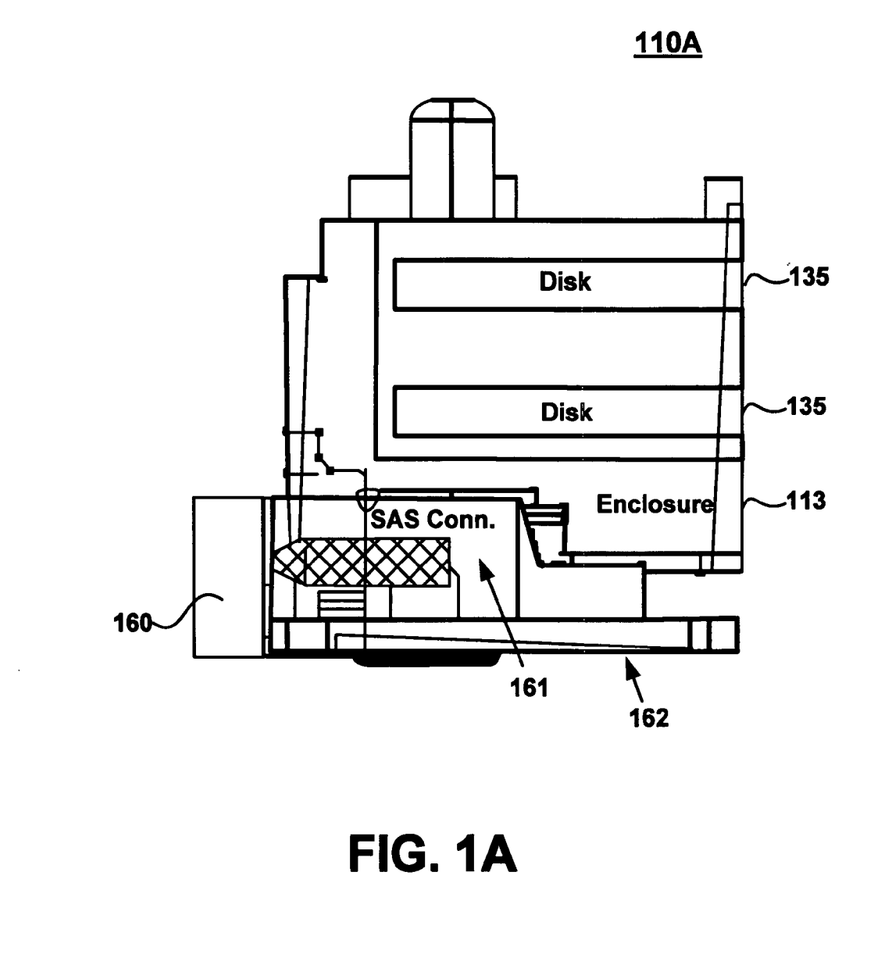
FIG. 1A depicts a multi-disk disk drive and connectors for connecting the multi-disk drive and a computer system.

Disk drives are used in the computer industry to store data on. Typically a computer system communicates with the disk drive to store data on the disk drive or to read data from the disk drive. The computer system could be an individual computer, such as a desk top computer or a lap top computer, or it could be a server system. Connectors can be associated with the disk drive and the computer system for connecting the disk drive and the computer system together. Further, as the computer industry is maturing, a card may be associated with a disk drive which is used for communicating between the disk drive and the computer system. For example, the card can be used as a part of writing data to the disk drive, reading data from the disk drive, or turning the power of the disk drive on or off. FIG. 1A depicts a multi-disk disk drive 110A with a card 162, a connector 161 associated with the disk drive 110A and a connector 160 that could be associated with a computer system.

Figure 1B:
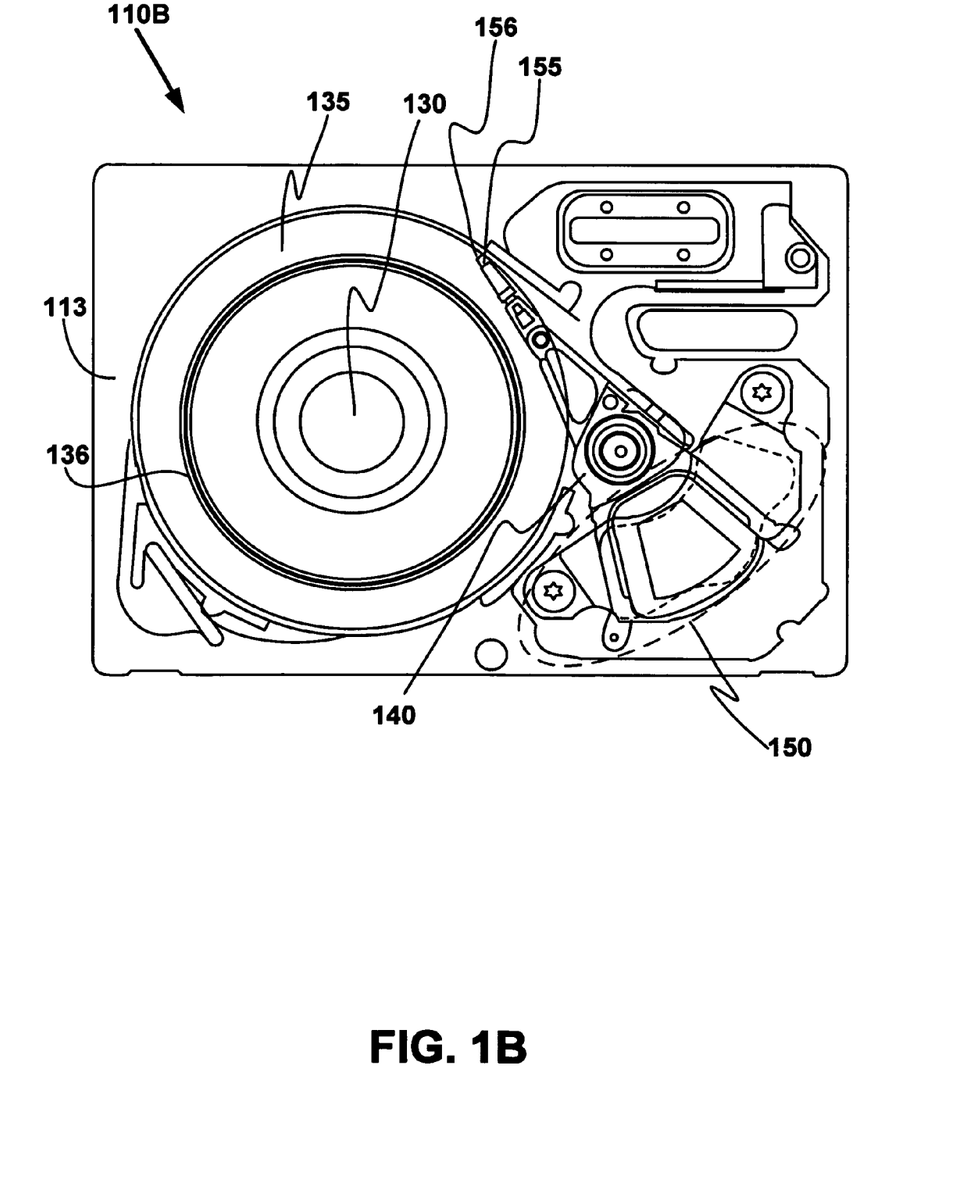
FIGS. 1B and 1C depict prior art disk drives in order to facilitate the discussion of using connectors.
Figure 1C:
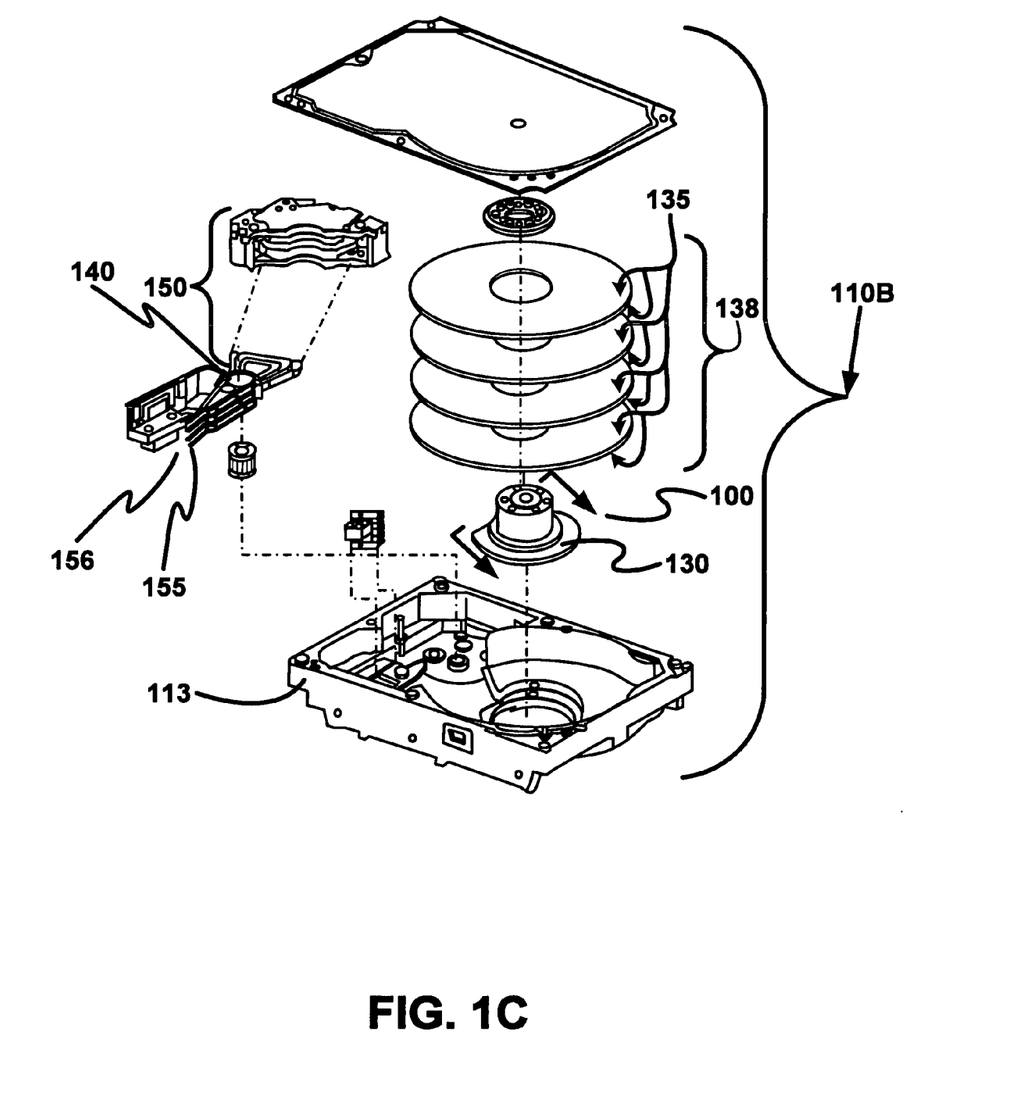

FIGS. 1B and 1C depict prior art disk drives in order to facilitate the discussion of using connectors. FIG. 1B depicts a top down view of a prior art disk drive. FIG. 1C depicts a similar disk drive, but with all of its components in an isometric expanded view. The disk drive 110B includes a base casting 113, a motor hub assembly 130, a disk 135, an actuator 140, a magnetic read write head 156, a slider 155 and a voice coil motor 150. What is commonly known as an "enclosure" is formed, among other things, from the base casting 113 and a cover (not shown).

The components are assembled into a base casting 113, which provides attachment and registration points for components and sub assemblies. Data can be recorded onto the surface of the disk 135 in a pattern of concentric rings known as data tracks 136. The surface of the disk 135 is spun at high speed by means of a motor hub assembly 130. Data tracks 136 are recorded onto the disk 135's surface by means of a magnetic read write head 156, which typically resides at the end of a slider 155. The actuator 140 can be used to position the magnetic head 156 over the disk 135's surface. Since FIG. 1A is a top down view it only depicts a single disk 135. One skilled in the art understands that what is described for a disk drive with a single disk applies to a disk drive with multiple disks. The embodied invention is independent of the number of head disk combinations.

SUMMARY OF THE INVENTION

Embodiments of the present invention pertain to sealing an enclosure for a disk drive form factor. According to one embodiment, material is removed from a base casting for the disk drive form factor to enable insertion of a component. The removal of the material results in a portion of the base casting being thin enough to potentially cause an inadvertent hole in the base casting. A hole is purpose created in the base casting to avoid development of the inadvertent hole. A seal is used to cover the created hole in a manner that allows for insertion of the component.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

DETAILED DESCRIPTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Overview

Connectors can be used to enable computer systems to communicate with disk drives. Further, as the industry has matured, smaller disk drives have been developed. One way of manufacturing disk drives is to pour aluminum into form factors to create the base casting among other things. Small form factors are used to manufacture small disk drives (referred to hereinafter as "small form factor disk drives").

Figure 2:
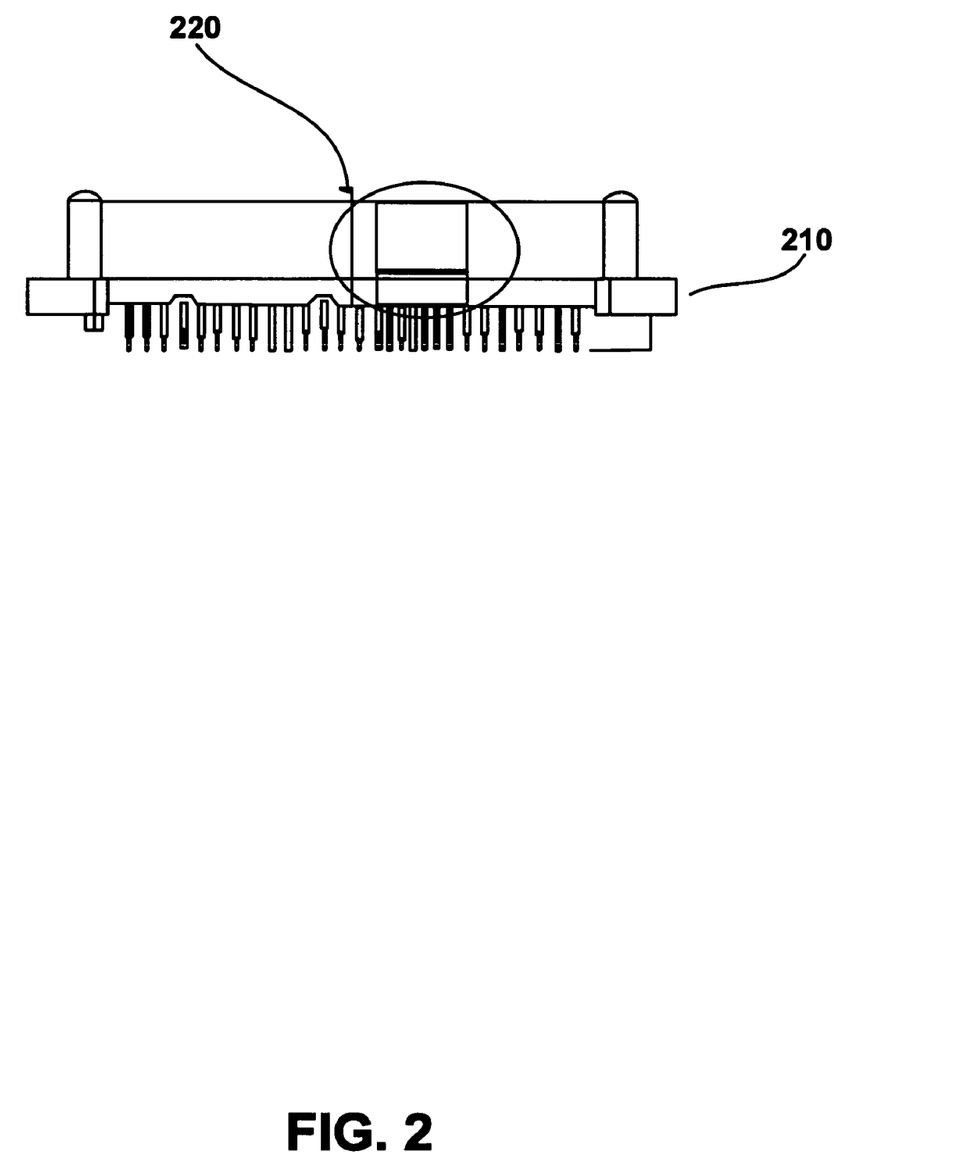
FIG. 2 depicts an additional feature which results in a connector that is larger than a typical connector, according to one embodiment.

At times additional features may be added to a connector, thus, enlarging the connector. For example, the manufacturer of a computer system may want their connector to be stiffer than a typical connector. In order to provide a stiffer connector, more material may be added to the typical connector. The additional material is an example of an "additional feature" that is added to the typical connector. A typical connector 160 is 1.8 millimeters (mm) thick plus or minus 0.3 mm. FIG. 2 depicts an additional feature 220 which results in a connector 210 that is larger than a typical connector 160, according to one embodiment. The additional feature, according to one embodiment, is approximately 2.8 mm thick.

Figure 3:
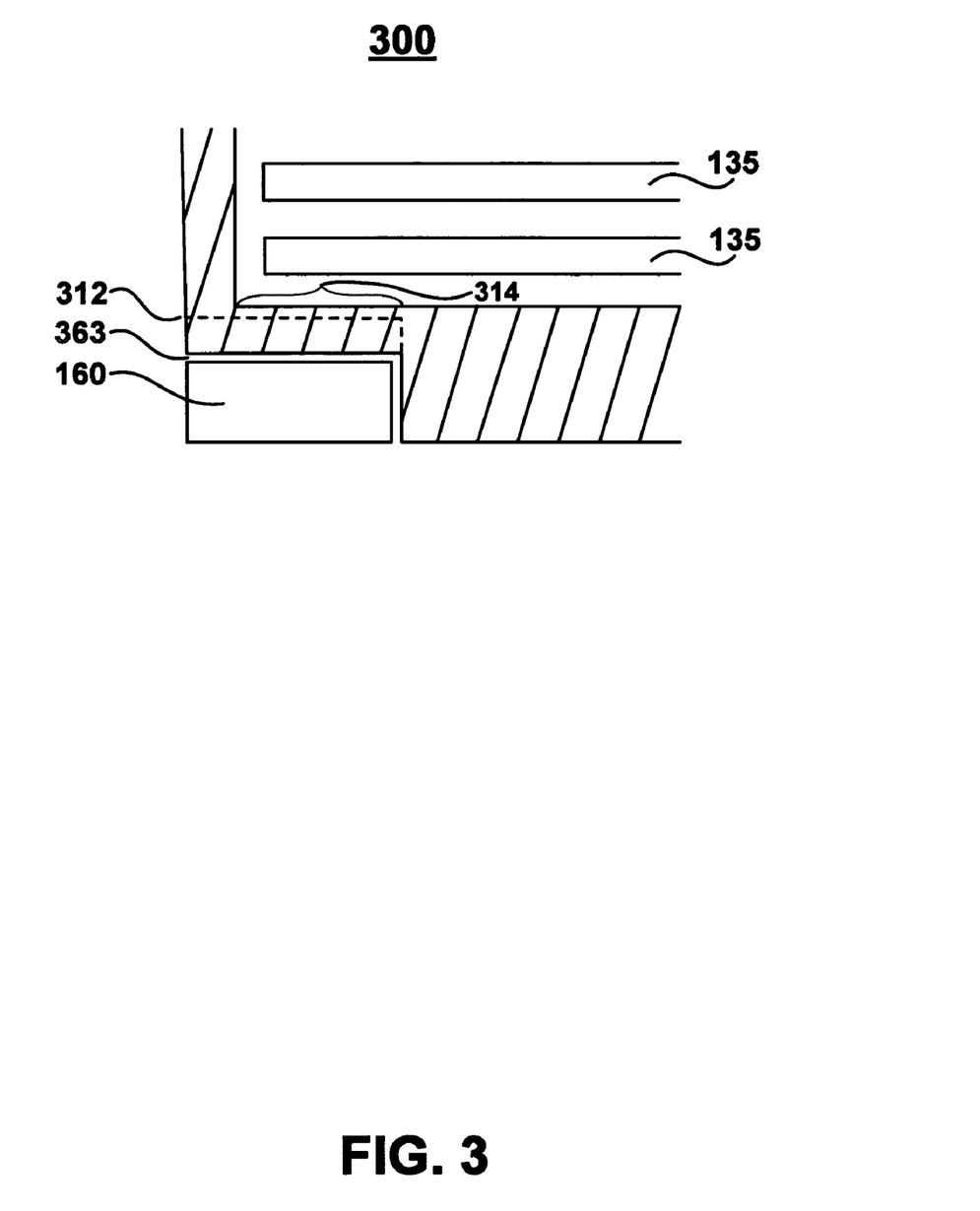
FIG. 3 depicts a portion of a disk drive with a base casting and a connector that is inserted into an insertion point, according to one embodiment.

The walls and bottom of a base casting that is made from a small form factor are thin. In order to accommodate a larger connector 210, the insertion point for the connector will need to be enlarged. For example, FIG. 3 depicts a portion of a disk drive 300 with a base casting 113 and a connector 160 that is inserted into an insertion point 363, according to one embodiment. In order to accommodate a connector 210 that is larger than connector 160, the insertion point 363 would need to be enlarged as indicated by the dotted line 312. As a result, a portion 314 of the base casting 113 would become thinner than what is accepted by industry standards and thus prone to breaking resulting in an "inadvertent hole" in the base casting 113. Thus according to one embodiment, a hole is purposely created where the thin portion 314 of the base casting 113 would be. The created hole can be sealed with a seal as will become more evident.

Although many of the embodiments were described in the context of a small form factor disk drive, various embodiments apply to form factors for any disk drive where the creation of an insertion point causes an inadvertent hole in the base casting. Although many of the embodiments were described in the context of an insertion point potentially resulting in an inadvertent hole, various embodiments apply to any removal of material from the base casting which could potentially cause an inadvertent hole in the base casting. For example, material may be removed from a base casting to create an air gap against some electrical component on a card.

Figure 4:
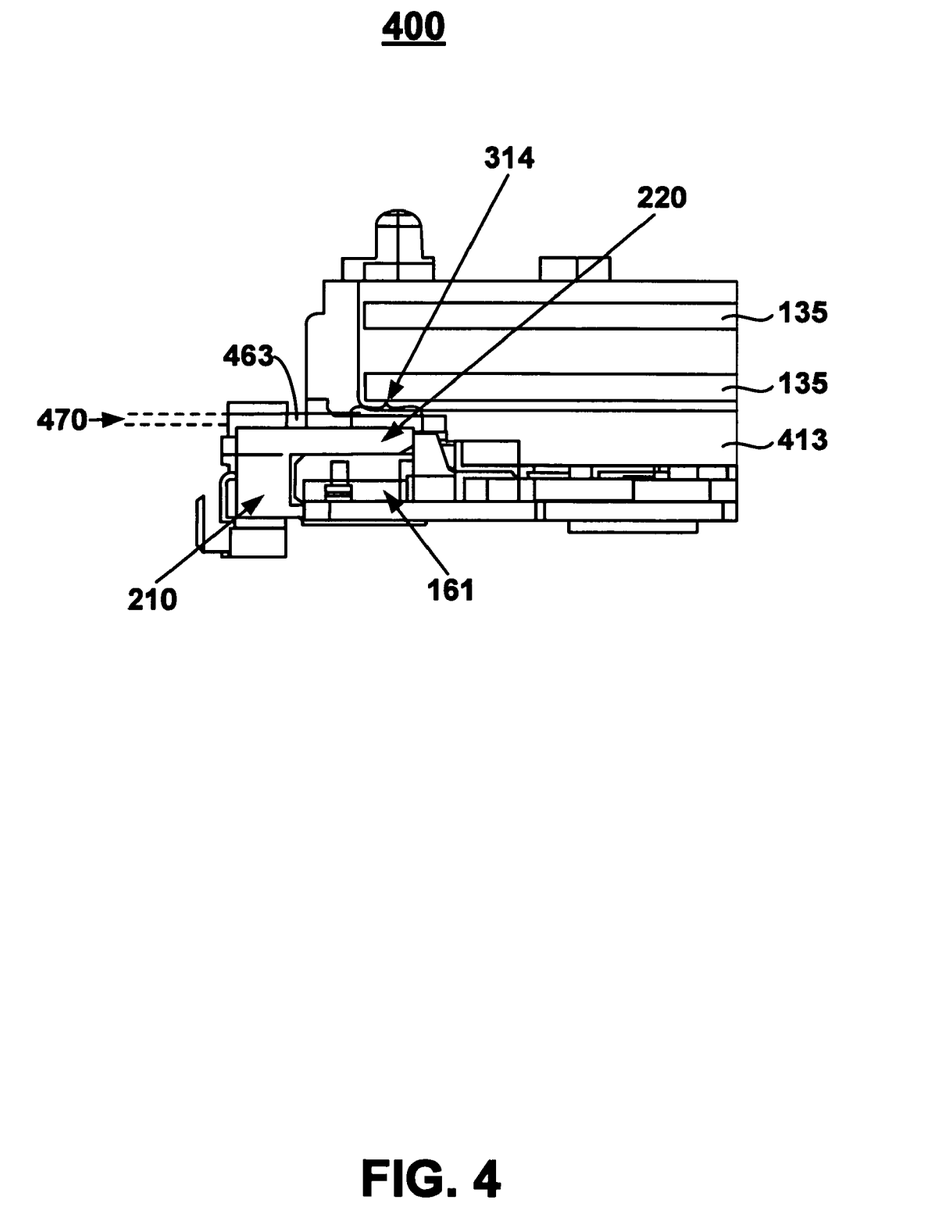
FIG. 4 depicts a small form factor disk drive with an enclosure that is sealed, according to one embodiment, due to a connector with an additional feature.

Industry Standard for Cast Aluminum and Clean Environment Inside the Disk Drive FIG. 4 depicts a small form factor disk drive 400 with an enclosure that is sealed, according to one embodiment, due to a connector 210 with an additional feature 220. The connector 210 is inserted into an insertion point 463. Since the connector 210 is larger than a typical connector 160 the thickness of the base casting 113 is thinner as indicated with reference number 470 than the industry standard.

The industry standard for the minimum thickness of cast aluminum ranges from approximately 0.2 millimeters (mm) to approximately 0.5 mms. Typically, the thin portion 314 would be approximately 0.15 mm thick. A portion of a base casting that is thinner than the minimum thickness specified by the industry standard is at risk of breaking.

As is well known in the industry, it is important that the environment inside of a disk drive be kept clean. For example, a disk drive can be damaged and data can be lost if a particle comes between a read write head 156 and the surface 135 of a disk. Therefore, it is important to provide for larger connectors 210 but at the same time maintain a clean environment inside of a disk drive.

The Seal

Figure 5:
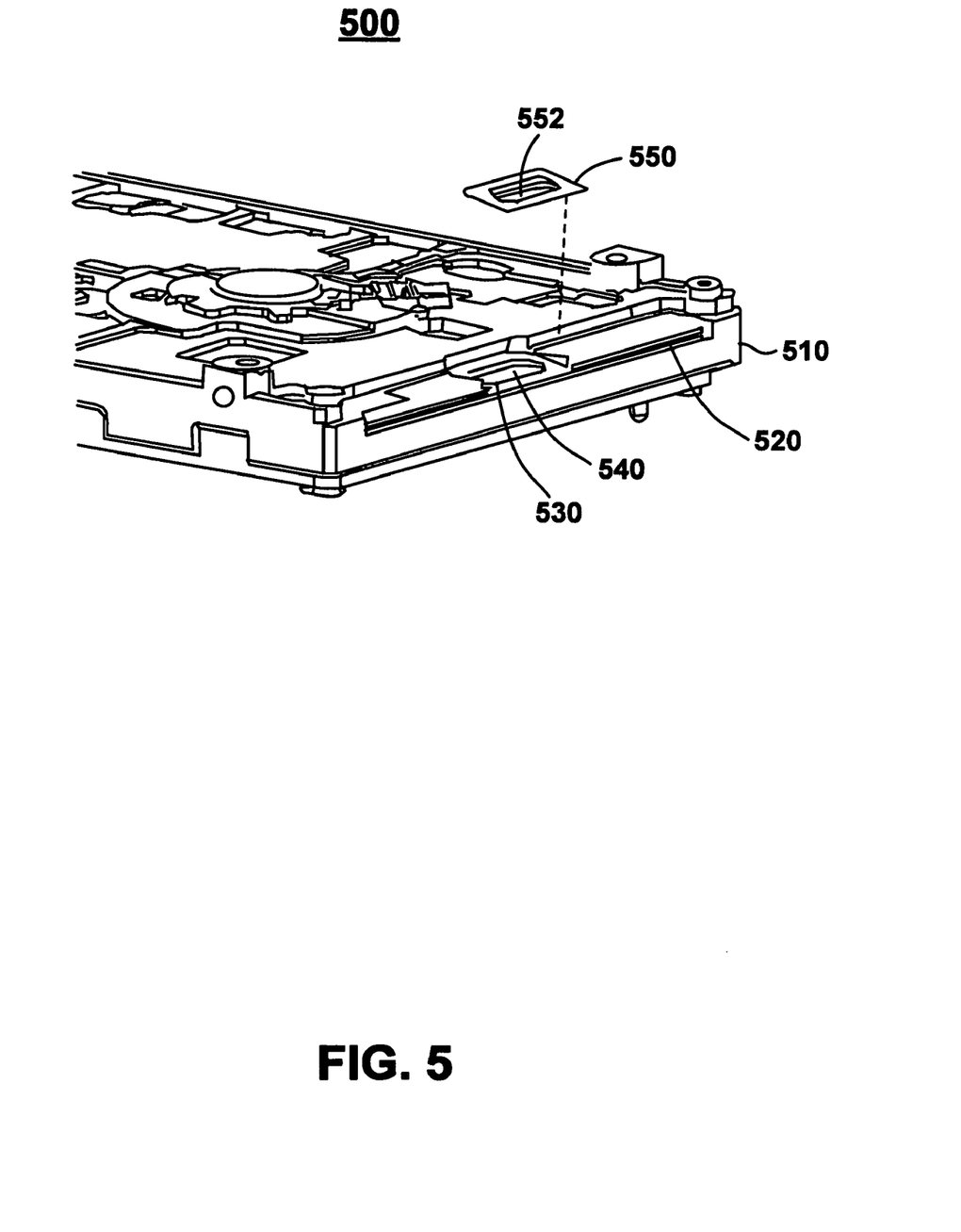
FIG. 5 depicts the bottom side of a small form factor disk drive's base casting, according to one embodiment.

FIG. 5 depicts the bottom side of a small form factor disk drive's base casting, according to one embodiment. As depicted in FIG. 5, the small form factor disk drive 500 includes a base casting 510, an interface 520 for a card, an insertion point 530 for inserting a connector 210, the created hole 540, and a seal 550 for sealing the created hole 540.

The seal 550 can be made of plastic, such as PET, or can be made of metal, among other things. As depicted in FIG. 54, the seal 550 is positioned outside of the base casting 510 and has a recess 552 that fits snugly into the created hole 510. A seal that is positioned outside of the base casting 510 can be easily replaced in the event that the seal becomes defective.

Figure 6A:
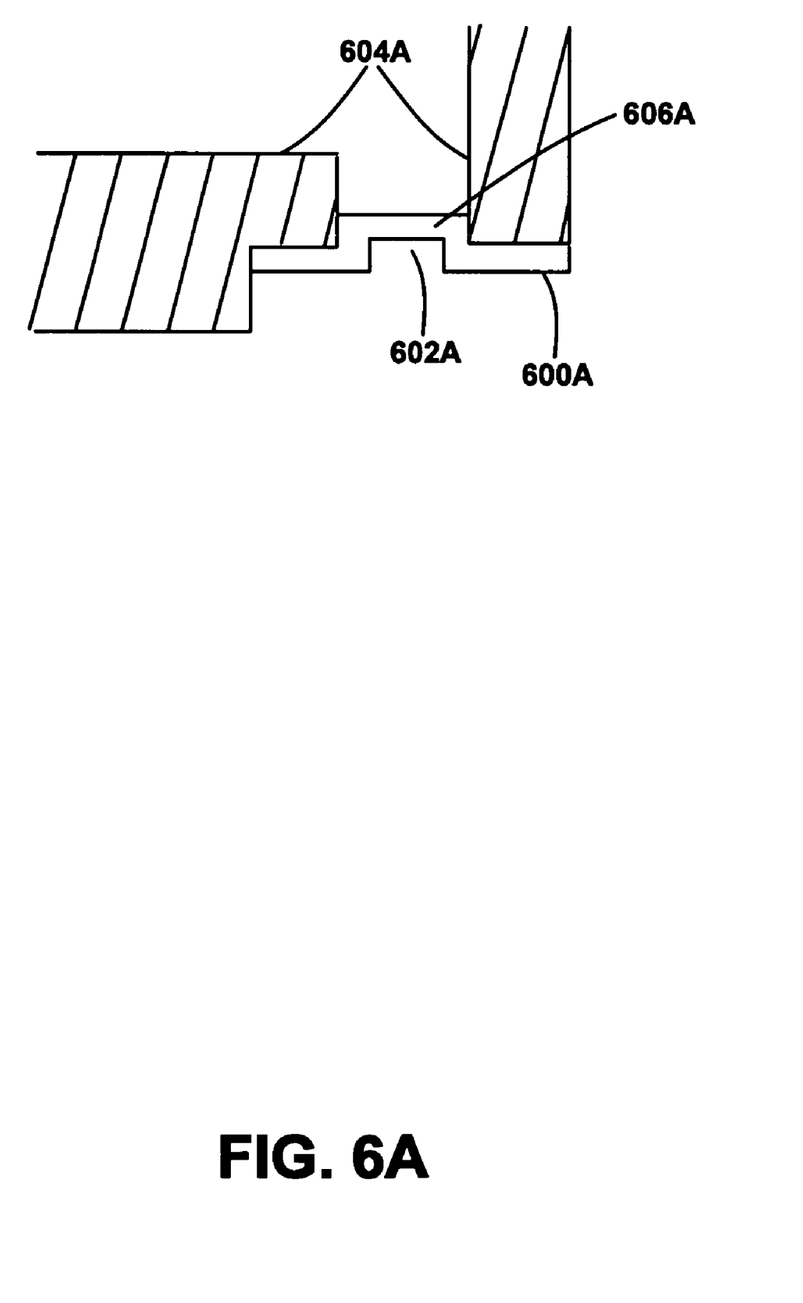
FIGS. 6A-6D depict cross section views of seals in relationship to base castings, according to various embodiments of the present invention.
Figure 6B:
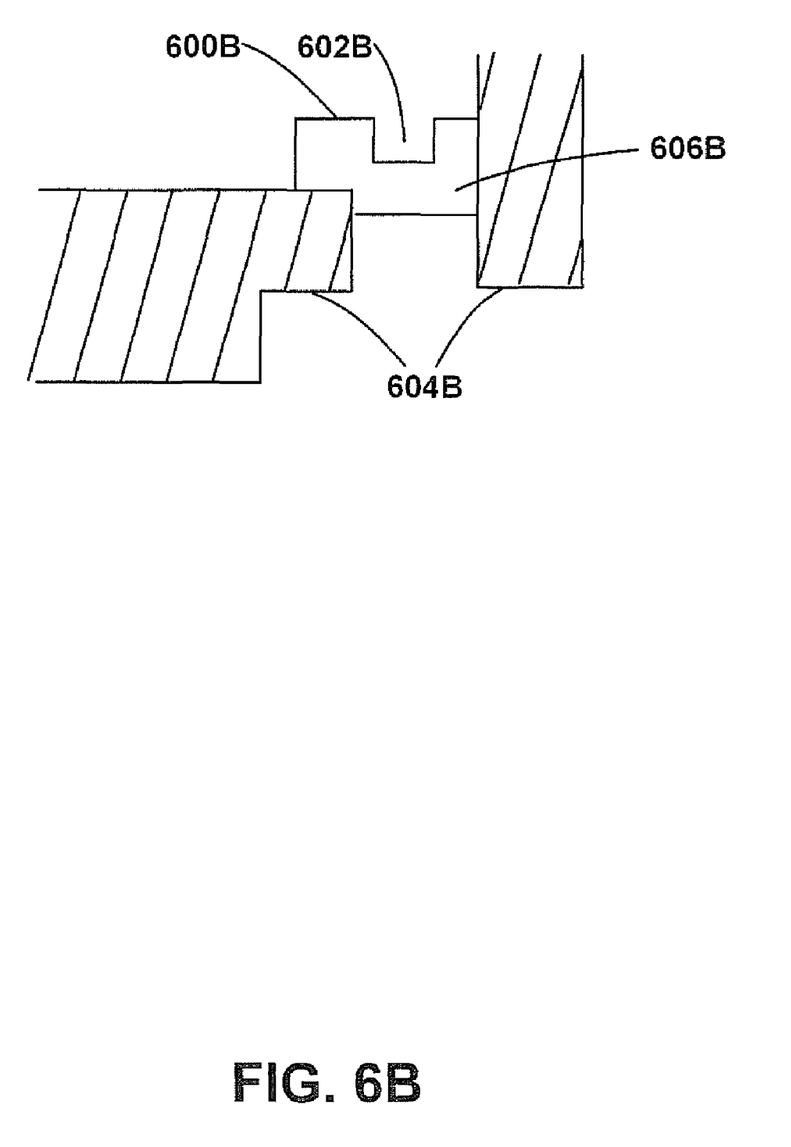

FIGS. 6A-6D depict cross section views of seals in relationship to base castings, according to various embodiments of the present invention. FIG. 6A depicts a seal 600A that is positioned outside of the base casting 604A. The seal 600A has a recess 602A in the middle. The seal 600A is similar to the seal 550 depicted in FIG. 5. FIG. 6B depicts another seal 600B that is positioned inside of the base casting 604B. The seal 600B has a recess 602B in the middle. According to one embodiment, a portion of a seal can be fit into a portion of the created hole. For example, the seals 600A and 600B have portions 606A and 606B that fit into the created holes associated with the respective base castings 604A and 604B.

Figure 6C:
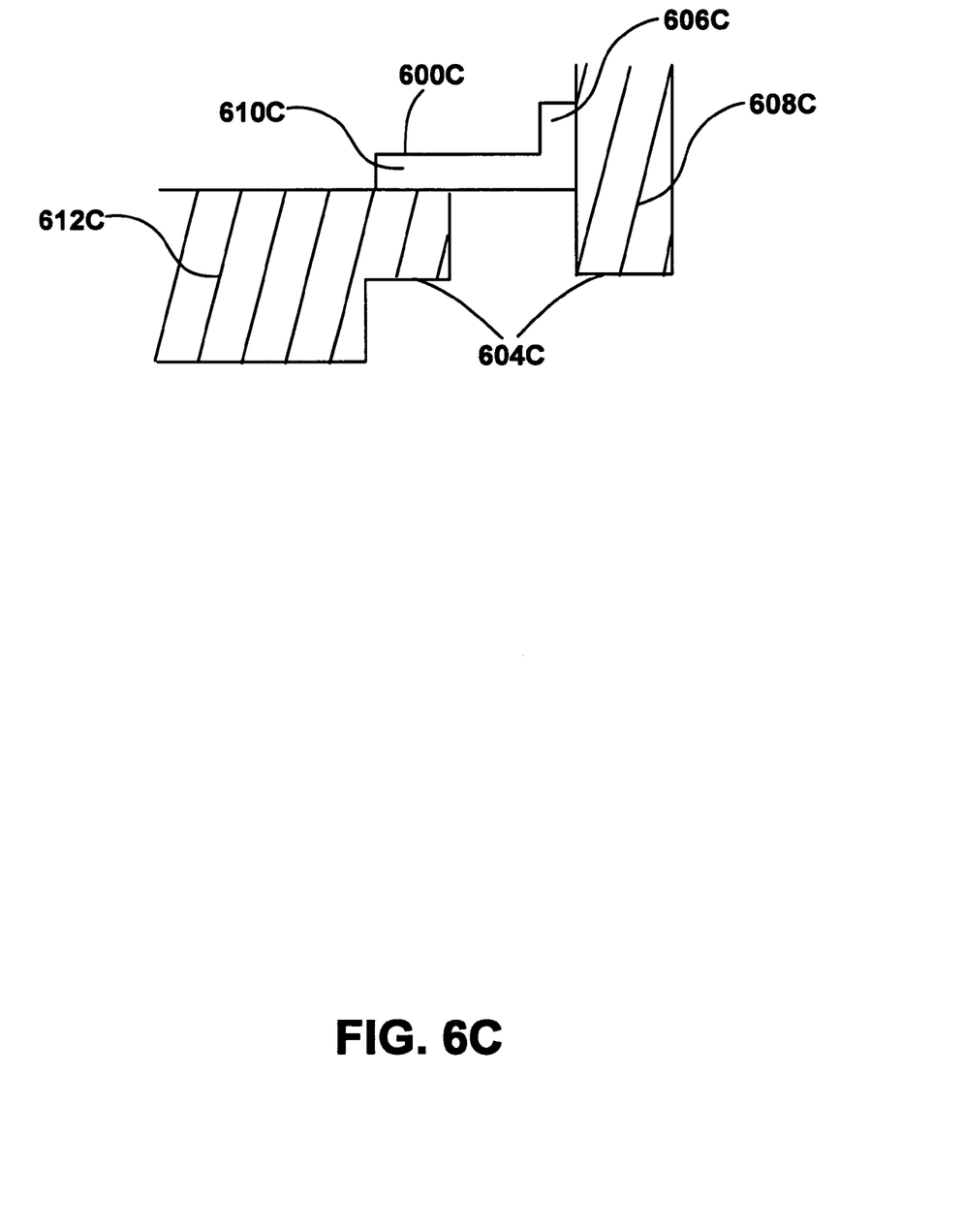
Figure 6D:
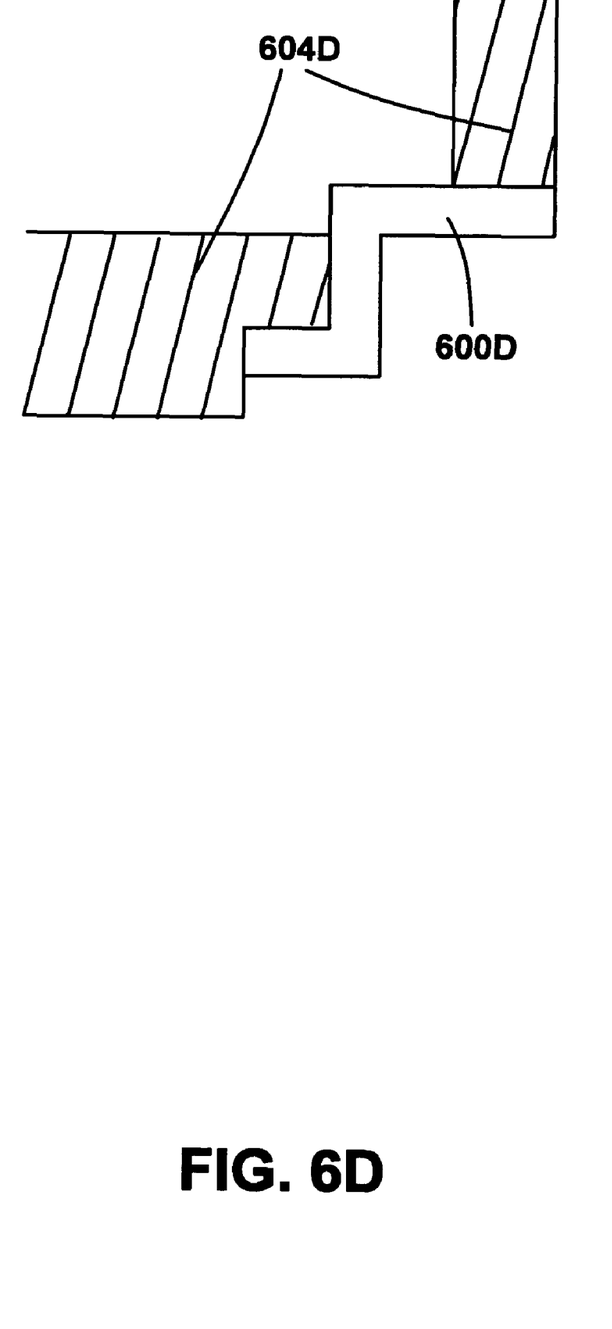

FIG. 6C depicts a seal 600C that is positioned inside of the base casting 604C. The seal 600C has two portions 606C and 610C. One of the portions 606C fits against the wall 608C of the base casting 604C. The other portion 610C fits along the bottom 612C of the base casting 604C. FIG. 6D depicts a seal 600D that is positioned outside of the base casting 604D. The shape of seal 600D is formed by 3 portions, i.e., two horizontal portions that are joined by a vertical portion.

Results

Referring to FIG. 1B, the insertion point for the connector, according to one embodiment, could be positioned at the left side of the disk drive 110B. Some prior art attempts have been made to solve the problem of the thin portion 312 of the base casting 113 by making the left wall of the base casting 113 thicker. However, in order to make the left wall of the base casting 113 thicker, the disk(s) 135 would have to be moved toward the voice coil motor 150 resulting in less space for the voice coil motor 150. This ultimately degrades the performance of the disk drive 110B since a smaller voice coil motor 150 would have less power to move the actuator 140. Thus, purposely creating a hole 540 and sealing it 540 with a seal 550, 600A, 600B, 600C, 600D, according to various embodiments of the present invention, not only solves the problem of a potential inadvertent hole but provides surprising results with regards to not degrading the performance of a disk drive 110B.

Figure 7:
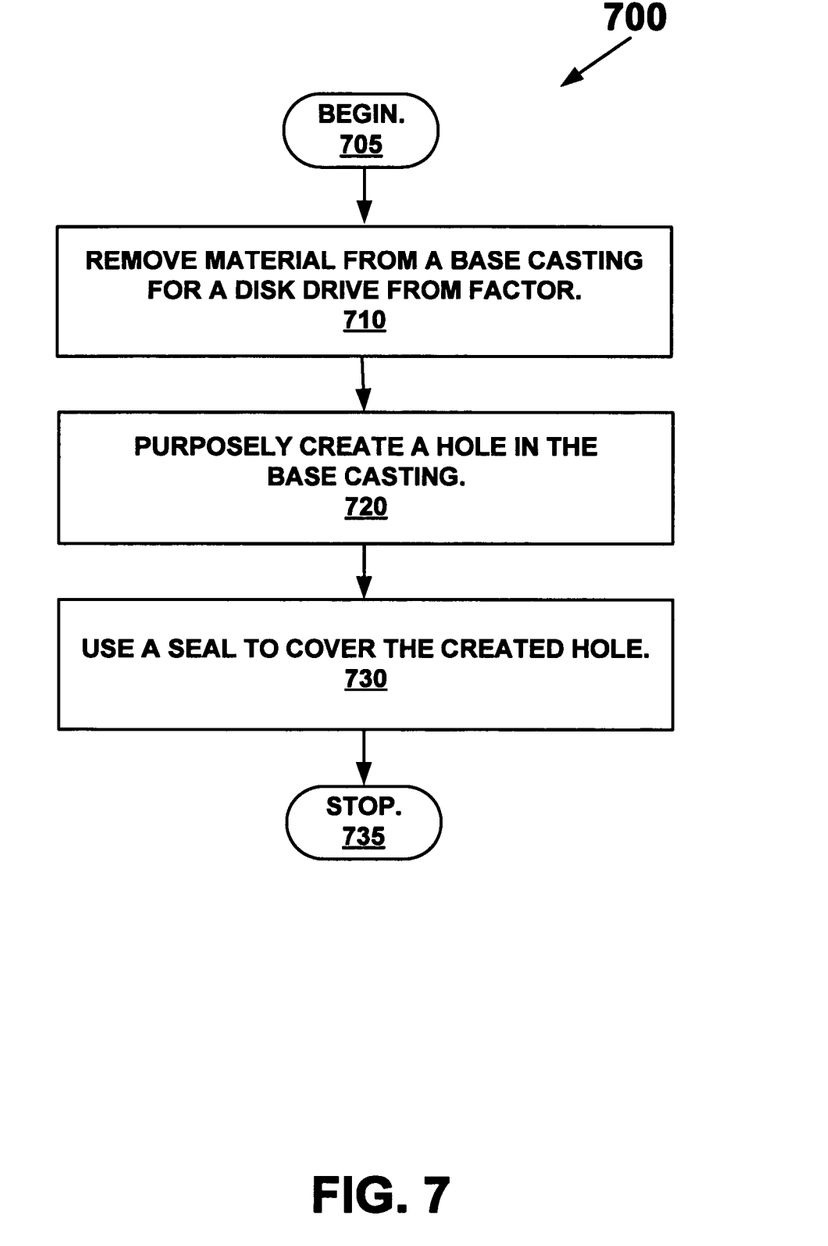
FIG. 7 depicts a flowchart for describing a method of sealing an enclosure for a small form factor disk drive, according to one embodiment.

Operational Example of a Method of Sealing an Enclosure for a Small Form Factor Disk Drive FIG. 7 depicts a flowchart 700 describing a method sealing an enclosure for a disk drive form factor, according to one embodiment of the present invention. Although specific steps are disclosed in flowchart 700, such steps are exemplary. That is, embodiments of the present invention are well suited to performing various other steps or variations of the steps recited in flowchart 700. It is appreciated that the steps in flowchart 700 may be performed in an order different than presented, and that not all of the steps in flowchart 700 may be performed.

At 705, the process begins.

At step 710, an insertion point for a connector is created in a base casting for the disk drive form factor, wherein the insertion point results in a portion of the base casting being thin enough to potentially cause an inadvertent hole in the base casting. For example, material is removed from the base casting of the disk drive form factor for an insertion point of a connector. The insertion point results in a portion of the base casting being thin enough to potentially cause an inadvertent hole in the base casting. Referring to FIG. 5, an insertion point 530 is created in a base casting 510 for a small form factor disk drive 500. The insertion point 530 results in the base casting 510 being thin enough, for example as discussed in the context of portion 312, to potentially cause an inadvertent hole in the base casting 510.

The insertion point 530 can be created by using a small form factor that results in the base casting having an insertion point. Alternatively, the insertion point 530 can be created by removing material from the base casting after it has been cast. For example, the cast aluminum that the base casting 510 is made from can be milled. Although these are two examples of how an insertion point 530 can be created, any conventionally known technique for creating insertion points can be used.

At step 720, a hole is purposely created in the base casting to avoid development of the inadvertent hole. For example, in order to prevent the development of an inadvertent hole at the thin portion 312, a hole 540 is purposely created in the base casting 510.

The hole 540 can be created by using a small form factor that results in the base casting 510 having a hole 540. Alternatively, the hole 540 can be created by removing material from the base casting 510 after it 510 has been cast. For example, the cast aluminum that the base casting 510 is made from can be milled. Although these are two examples of how a hole 540 can be created, any conventionally known technique for creating holes 540 in a base casting 510 can be used.

Although steps 710 and 720 have been described as separate steps, according to one embodiment, steps 710 and 720 could be performed simultaneously, for example, by using a small form factor that provides for an insertion point 530 and a purposely created hole 540.

At 730, a seal is used to cover the created hole in a manner that allows insertion of a component. For example, since it is important to maintain a clean environment inside of the disk drive 500, a seal 550, 600A-600D, is used to cover the created hole 540 in a manner that allows the insertion of a connector 210, which has an additional feature 220, into the insertion point 530.

At 735, the process ends.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A disk drive form factor, the disk drive form factor comprising:
    a base casting, wherein said base casting comprises a first thickness, wherein said first thickness is greater than or equal to approximately 0.2 millimeters;
    a connector insertion point for insertion of a connector in said base casting for the disk drive form factor, wherein the connector insertion point comprises a second thickness less than approximately 0.2 millimeters;
    a purposely created connector hole in the connector insertion point in the base casting for insertion of the connector into the connector insertion point, wherein the purposely created connector hole comprises:
        a first inlet;
        a first outlet; and
        a first enclosing wall defining an interior passage between the first inlet and the first outlet; and
    a seal to cover the purposely created connector hole in a manner that allows the insertion of the connector, wherein the seal comprises:
        an outer portion positioned outside the base casting and configured for surrounding the purposely created hole; and
        an inner portion; and
    wherein said outer portion and said inner portion are configured to form a recess in said seal, said recess comprising:
        a first end having a second inlet, wherein said second inlet is configured for receiving the connector;
        a second end;
        a second enclosing wall defining at least a portion of the connection insertion point between the first end and the second end, wherein an outer surface of the second enclosing wall fits against an inner surface of the first enclosing wall; and
        a depth that is less than that of the second thickness of the base casting.

2. The disk drive form factor of claim 1, wherein the seal is made of a material that is selected from a group consisting of plastic and metal.

3. The disk drive form factor of claim 2, wherein the plastic is PET.

4. The disk drive form factor of claim 2, wherein the disk drive form factor is a small form factor disk drive.

5. The disk drive form factor of claim 1, wherein the seal is positioned inside of the disk drive form factor to cover the purposely created connector hole.

6. The disk drive form factor of claim 1, wherein the seal has one portion that fits against a wall of the base casting and another portion that fits along a bottom of the base casting.

7. The disk drive form factor of claim 1, wherein the seal has a first and second horizontal portions and a vertical portion that joins the first and second horizontal portions.

* * * * *